US012694316B2

(12) United States Patent
Noel et al.

(10) Patent No.: US 12,694,316 B2
(45) Date of Patent: Jul. 28, 2026

(54) TRANSPORT-BASED QUBIT-ARRAY LOADING

(71) Applicant: ColdQuanta, Inc., Boulder, CO (US)

(72) Inventors: Thomas William Noel, Lafayette, CO (US); Mark Saffman, Madison, WI (US)

(73) Assignee: ColdQuanta, Inc., Boulder, CO (US)

( * ) Notice: Subject to any disclaimer, the term of this patent is extended or adjusted under 35 U.S.C. 154(b) by 889 days.

(21) Appl. No.: 16/998,142

(22) Filed: Aug. 20, 2020

(65) Prior Publication Data

US 2021/0279628 A1     Sep. 9, 2021

Related U.S. Application Data

(60) Provisional application No. 62/986,673, filed on Mar. 7, 2020.

(51) Int. Cl.
*G06N 10/40*           (2022.01)
(52) U.S. Cl.
CPC ................................... *G06N 10/40* (2022.01)
(58) Field of Classification Search
CPC .............................. G06N 10/00; G06N 10/40
See application file for complete search history.

(56) References Cited

U.S. PATENT DOCUMENTS 10,504,033 B1     12/2019   King
11,150,609 B1 *   10/2021   Parazzoli .............. H01J 49/424

2018/0107938 A1     4/2018   Morello
2018/0157986 A1     6/2018   Oxford
2018/0314969 A1    11/2018   Thornton
2020/0035902 A1     1/2020   Olivadese
2020/0116623 A1 *   4/2020   Cooper-Roy .......... G02B 21/32
2020/0161446 A1 *   5/2020   Anderson ......... H01L 29/66439
2020/0175411 A1 *   6/2020   King ...................... G06N 20/20
2020/0185120 A1 *   6/2020   Keesling Contreras .....................
                                                    G21K 1/093
2020/0395448 A1    12/2020   Conradson
2021/0049494 A1     2/2021   King

OTHER PUBLICATIONS

Blakestad, R. B., et al. "Near-ground-state transport of trapped-ion qubits through a multidimensional array." Physical Review A 84.3 (2011): 032314. (Year: 2011).*

(Continued)

*Primary Examiner* — Markus A. Vasquez
(74) *Attorney, Agent, or Firm* — Michael Attisha; Samuel Means; Greenberg Traurig, LLP

(57)                ABSTRACT

When a molecule is lost from a site of a qubit array, the site can be identified as a "target" site. A target site can be reloaded by transporting a molecule from a reservoir at least two millimeters to the target site. Alternatively, in response to the identifying, a molecule that has been transferred from the reservoir to a qubit-array region including the qubit array can be transferred to the target site. Quantum-logic language (QLL) programs can continue qubit operations on the array during transfers from the reservoir to the qubit region. Such operations can also continue during transfer from within the qubit region to a target site; in some cases, these latter operations are limited to sections of the qubit array not including a target site.

47 Claims, 10 Drawing Sheets

(56) References Cited

OTHER PUBLICATIONS

Green, Aaron, and Emily Kaplitz. "Quantum Random Access Memory."
(2019). (Year: 2019).*

Jau, Y-Y., et al. "Entangling atomic spins with a strong Rydberg-dressed interaction." arXiv preprint arXiv:1501.03862 (2016). (Year: 2016).*

Picken, C. J., R. Legaie, and J. D. Pritchard. "Single atom imaging with an sCMOS camera." Applied Physics Letters 111.16 (2017). (Year: 2017).*

* cited by examiner

Vacuum Cell 806

Reservoir Region 121

Baffling 812

Qubit-Array Region 110

218

922

920

Reservoir Region Pump 924

Qubit-Array Region Pump 926

TRANSPORT-BASED QUBIT-ARRAY LOADING

CROSS-REFERENCE TO RELATED APPLICATIONS

The present application claims the benefit under 35 U.S.C. § 119(e) of U.S. Provisional Patent Application No. 62/986,673, filed Mar. 7, 2020, titled "TRANSPORT-BASED RELOADING OF ATOM QUBIT ARRAY," which is hereby incorporated by reference in its entirety.

BACKGROUND

In part because they operate on qubits that can assume a multitude of complex values as opposed to classical bits, which can only assume a pair of values (0 and 1), quantum computers can perform some tasks exponentially faster than their classical counterparts. Ion-based and neutral-atom-based quantum computers have advantages over superconductor-based quantum computers in terms of cooling requirements and manufacturing tolerances (as like-species ions and like-species neutral atoms are naturally identical). Neutral atoms have an advantage over ions in that they can be packed closely together without interacting and, yet, be selectively made to interact by exciting them to Rydberg states.

Herein, "molecule" refers to the smallest particle of a substance that retains all the properties of the substance and is composed of one or more atoms; this definition, which is set forth in the *Merriam Webster Dictionary*, encompasses monatomic (single-atom) molecules as well as polyatomic molecules. Thus, gas-phase alkali (e.g., potassium, rubidium, and cesium) atoms qualify as molecules under this definition. Not used herein is an alternative and more restrictive definition set forth in the *IUPAC Gold Book*: "An electrically neutral entity consisting of more than one atom".

BRIEF DESCRIPTION OF THE DRAWINGS

FIG. 1 is a high-level schematic diagram of a qubit-array system.

FIG. 2 is a more detailed schematic diagram of the qubit-array system of FIG. 1.

DETAILED DESCRIPTION

Figure 3A:
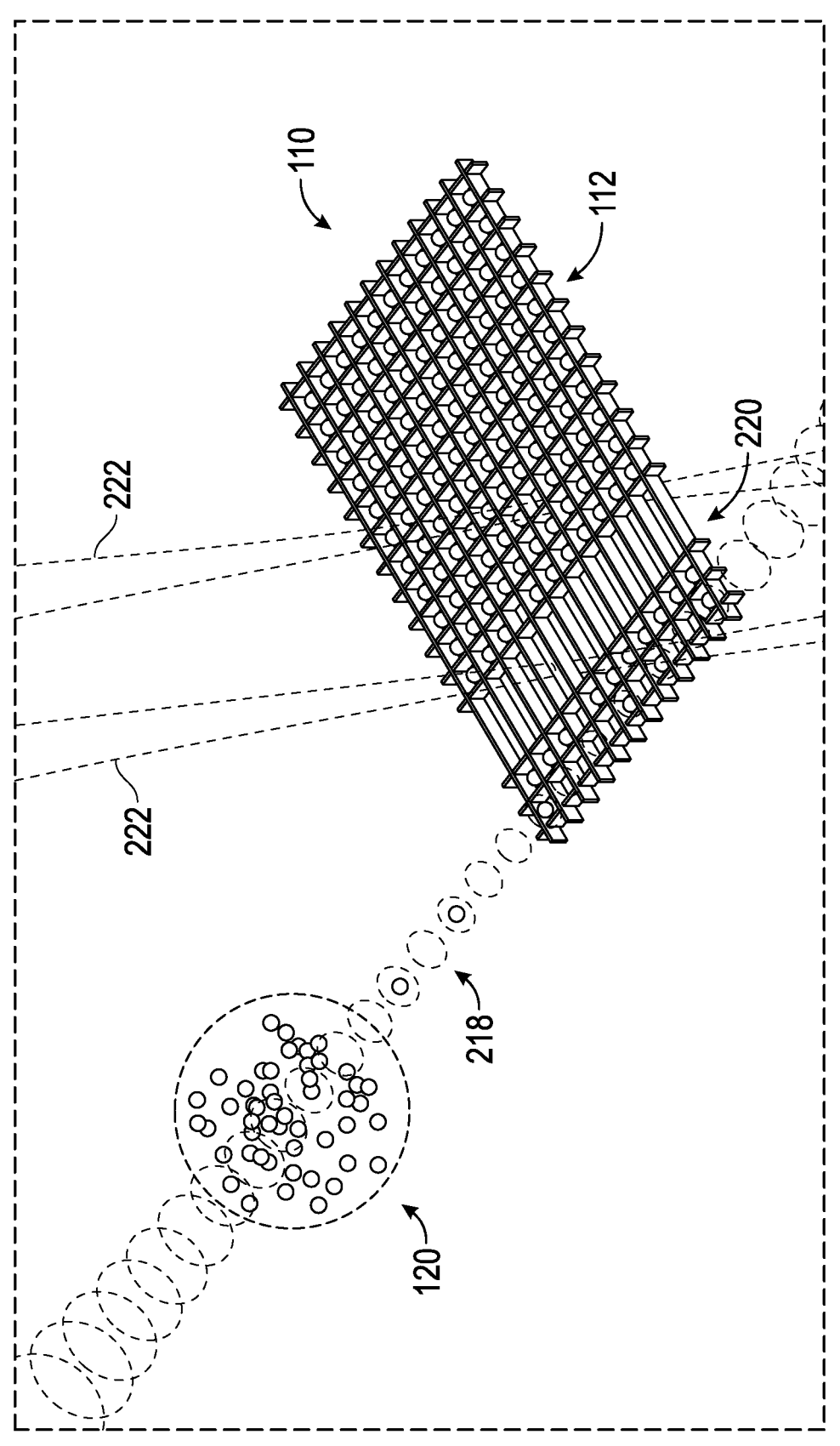
FIG. 3A is a perspective gray-scale representation of a qubit-site array of the qubit-array system of FIG. 1 along with optical transport mechanisms used to load molecules into the qubit site array.

The present invention provides for continuous or otherwise minimally interruptive use of a molecule-based qubit array while a vacant array site is reloaded by transporting one or more molecules from a remote reservoir trap to target sites within the array. Target sites for loading can be identified and then loaded either: 1) directly from the reservoir; or 2) indirectly from the reservoir via a loading zone within a qubit-array region including the qubit array, the molecules to be loaded having been transported from the reservoir into the qubit array region. Typically, the sites identified include at least one site that has lost a molecule that was serving as a qubit carrier. The reservoir can be spaced at least two millimeters (2 mm) from the qubit-array region so as to avoid undesired interactions that might affect runtime performance of the qubit array. The qubit array can be used as a register in a quantum computer or a quantum simulator; alternatively, the qubit array can be used as an active component of a sensor, an atomic clock, a magnetometer, an electric sensor, a gyroscope, an atomic interferometer, a positioning or direction-finding device, a signal processing device, or other device.

Figure 1:
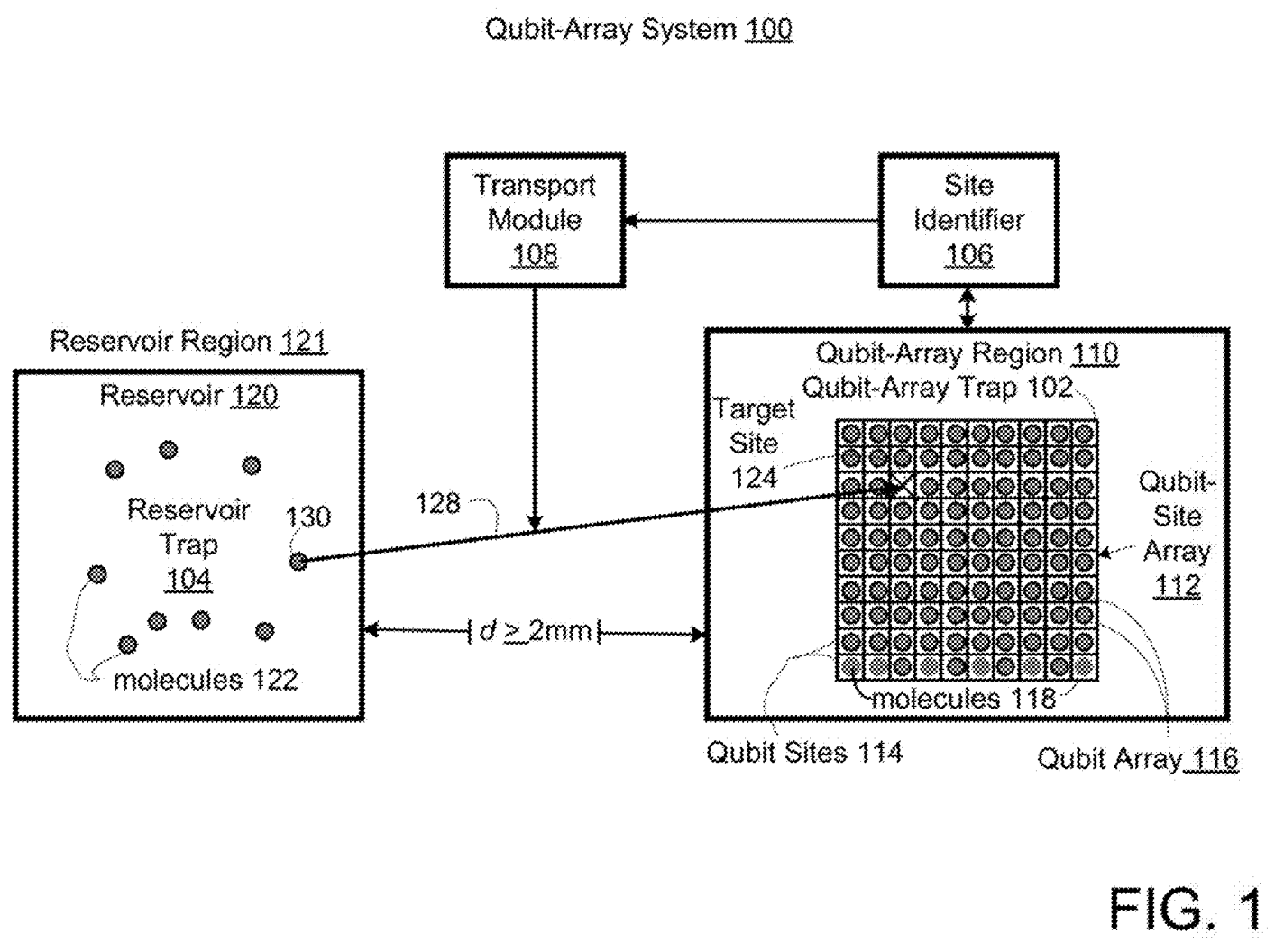

As shown in FIG. 1, a qubit array system 100 includes a qubit-array trap 102, a reservoir trap 104, a site identifier 106, and a transport module 108. Qubit-array trap 102 provides for a two-dimensional array of optical dipole traps; other embodiments provide for one- and three-dimensional qubit arrays. Qubit-array trap 102, which is disposed in a qubit-array region 110, defines a qubit-site array 112 of qubit sites 114 for storing a qubit array 116 of qubit molecules 118, e.g., cesium 133 ($^{133}$Cs) atoms. Reservoir trap 104, which can be an optical trap or a magneto-optical trap, can contain a reservoir 120 of molecules 122, which may also be $^{133}$Cs atoms. Reservoir 120 is disposed within a reservoir region 121, which is spaced from qubit-array region 110 by at least 2 mm to limit disturbance by reservoir molecules 122 of quantum states of array molecules 118. In an alternative embodiment, the reservoir is spaced less than 2 mm from the qubit-array region.

In other scenarios, other molecules are used, e.g., other alkali and alkaline earth elements: lithium, sodium, potassium, rubidium, cesium, francium, beryllium, magnesium, calcium, strontium, barium, or radium. While the illustrated embodiment provides for use of neutral alkali and alkaline-earth qubits, other embodiments can use other neutral monatomic molecules, neutral polyatomic molecules, and charged monatomic and polyatomic molecules (i.e., ions).

Site identifier 106 detects target subsets of one or more sites into which molecules are to be loaded; the sites of the target subset can include one or more sites from which a molecule of the array has been lost; in addition, the target subset can include sites that will be vacated as part of the transfer process, e.g., where a bucket-brigade loading procedure is used. The detection process can be non-destructive, e.g., non-invasive, to avoid unintended alteration of the states of array molecules. For example, the target set can contain a single target site 124 that site identifier 106 has determined is vacant while excluding the rest of the sites in array 112. As long as it excludes at least one array site, the target subset qualifies as a "proper" subset.

Once a target subset has been identified, transport module 108 can transport, along a path 128, at least one molecule 130 from reservoir trap 104 to a respective target site, e.g., site 124, of the target subset. Depending on the embodiment, transport of molecules from reservoir trap 104 to a target site can be direct or can take place in steps and involve one or more intermediate zones. While at least a final step of the transport of a molecule into an empty site can involve active manipulation of the molecule, preceding parts of the transport can be passive. Passive transport can be mediated by gravity (e.g., dropping a molecule from reservoir trap to the qubit-array region in a gravitational field). Active transport can be mediated by one or more of magnetic fields, magnetic-field gradients, light pressure, and moving optical tweezers. Embodiments of transport module 108 that utilize laser-based transport can include one or more acousto-optical deflectors and/or one or more spatial light modulators operating holographically or as optical switches.

This transport-based loading allows for continuous operation of qubit array 116. For example, manipulations (e.g., gate operations, readout) can continue in other parts of array 116 while reloading empty target site 124. In one scenario, the occurrence of vacant site 124 due to loss of a molecule is detected by site identifier 106 through non-invasive optical readout, and transport module 108 reloads the vacant target site 124 with a molecule 130 in response to this loss detection.

Figure 2:
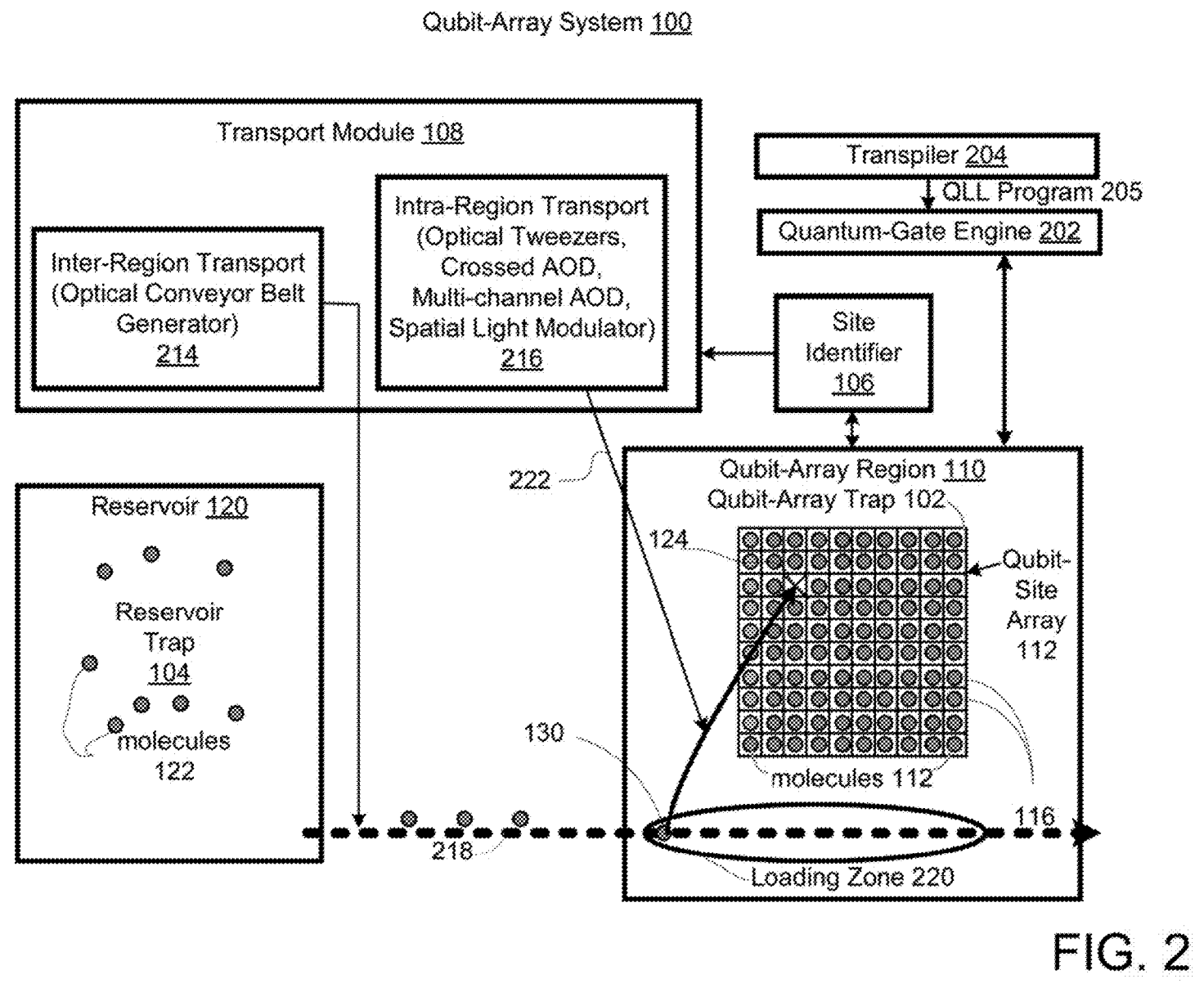

As shown in FIG. 2, qubit-array system 100 can include a quantum-gate engine 202 so that system 100 can serve as a gate-model quantum computer and qubit array 116 can serve as a register for the quantum computer. Quantum-gate engine 202 can receive operational instructions from a transpiler 204 that translates generic quantum gates to a quantum-logic-language QLL program 205 of system-specific gate operations. This transpiler 204 may be configured to take into account the current fill status of array 112 and/or ongoing reloading activity.

Transport module 108 includes an inter-region transport module 214 having an optical-conveyor-belt generator, and a multi-mode intra-region transport module 216, having optical tweezers, a crossed acousto-optic deflector (AOD), a multi-channel AOD, and a spatial light modulator generator. Inter-region transport module 214 can generate an optical conveyor belt 218 in the form of a moving standing wave of light. Optical conveyor belt 218 is used to transport, continuously, periodically, or intermittently, molecules from reservoir trap 104 into qubit-array-region 110, e.g., to a loading zone 220 within qubit-array region 110. Intra-region transport module 216 can generate optical tweezers 222 (or, depending on mode, crossed AODs, multi-channel AODs, or spatial light modulators) to move one or more molecules from optical conveyor belt 218 (e.g., from loading zone 220) to one or more respective target sites 126. In other words, path 128 of FIG. 1 has been divided into two segments, one associated with conveyor belt 218 and the other associated with optical tweezers 222. Optical conveyor belt 218 and tweezers 222 are shown in perspective view in FIG. 3A, where loading zone 200 takes the form of a secondary register.

Figure 3B:
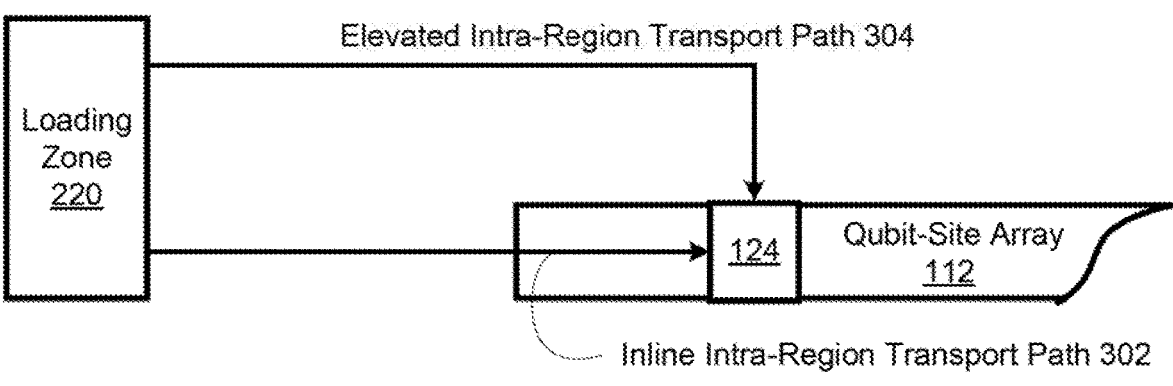
FIG. 3B is a schematic side-elevational view of a qubit-site array of FIG. 1 showing alternative intra-region transport paths from a loading zone to a target site.

The intra-region transport can take a variety of paths from loading zone 220 to a target site. For example, as shown in FIG. 3B, an "in-line" intra-region transport path 302 extends within the flat volume of qubit-site array 112, while an "elevated" intra-region transport path 304 runs parallel to a plane of the qubit-site array until aligned with the target site, e.g., target site 124, at which point the transported molecule can be transferred orthogonally (e.g., down) to target site 124.

To minimize disturbance of qubits, e.g., so that they are not unintentionally driven out of superposition, the loading zone and optical conveyor belt can be spaced at least 2 mm from the qubit array. Alternatively, one or more of magnetic fields, magnetic field gradients, light pressure, and moving optical tweezers can be used to implement a flow of molecules from the reservoir to the qubit-array region. The reservoir and the reservoir region can be spaced more than 2 mm, e.g., 10-100 mm, from the qubit-site array and the molecules contained therein. In other embodiments, this spacing can be less than or equal to 2 mm.

Figure 4:
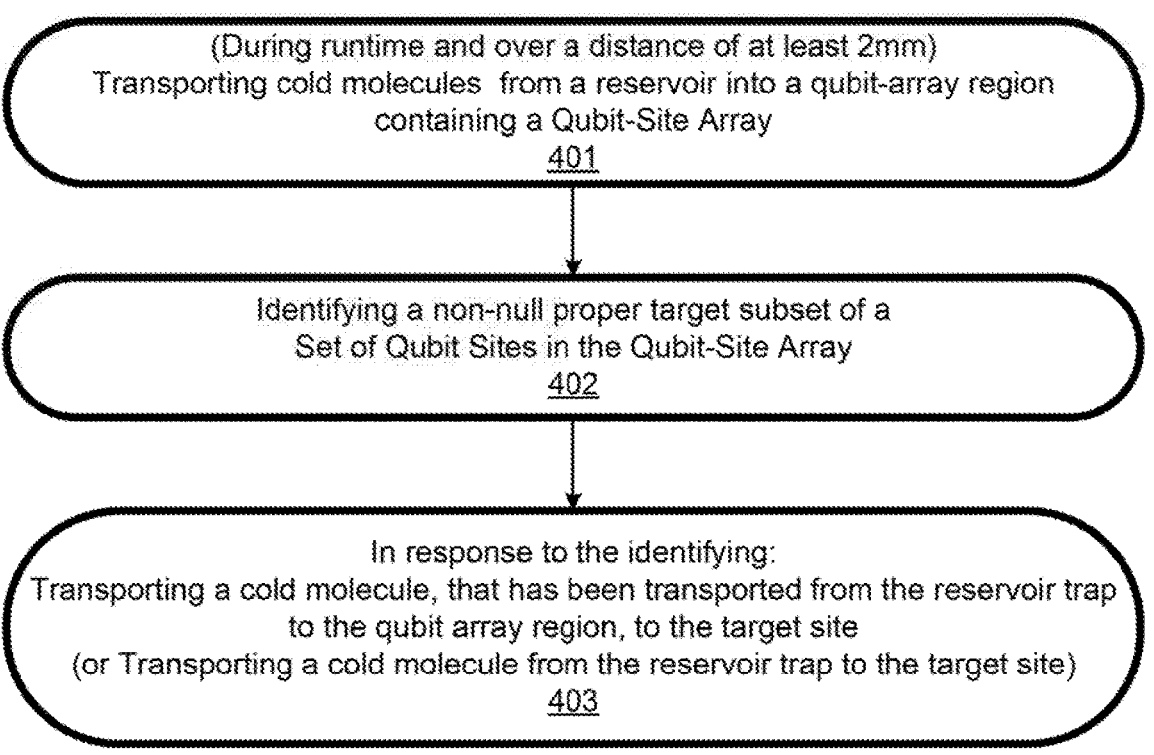
FIG. 4 is a flow chart of a transport-based qubit array loading process implemented in the system of FIG. 1 and in other systems.

A qubit-array loading process 400, flow charted in FIG. 4, includes, at 401, transporting cold molecules from a reservoir into a qubit array region containing a qubit-site array. Depending on the mode, this action can include transporting over a distance of 10-100 mm or at least over 2 mm. Also, this transporting can occur during runtime, that is, while at least one qubit contained in the array is storing a value computed by a quantum-logic language (QLL) program that the program is configured to read but has not yet read. In some scenarios, during intra-region transport of one or more molecules to array sites, circuits and other qubit operations can continue in array sections that are too distant from target sites and reloading paths to be affected by the transport.

At 402, a non-null proper target subset of a set of qubit sites in the qubit-site array is identified. In some embodiments, the identification is obtained using non-invasive imaging that does not disturb qubit values needed for continued runtime operation. "Non-null" means that that it includes at least one site, and "proper" means that it excludes at least one site. In many scenarios, the target subset includes one or more sites from which molecules serving as qubit carriers have been lost. In some of these, the target set contains only sites from which molecules have been lost. In others of these, the target subset can include sites from which molecules had not been lost but will have been vacated in the transfer process, for example, as in a bucket brigade transfer to be described further below with reference to FIG. 7.

At 403, in response to the identification, at least one molecule is transferred to a target site. In some embodiments, this transfer can be directly from the reservoir to the target site. In other embodiments, the transfer can be a transfer from within the qubit-array region to the target site. For example, the transfer at 403 can be the second or otherwise last segment of a multi-segment transfer beginning with a transport at 401. Action 403 can include parallel concurrent transfers to plural target sites, e.g., using plural optical tweezers.

The delivery of a molecule into a target site can be directed so that the impact on neighboring molecules within a qubit array is negligible. For example, delivery may be implemented along a direction orthogonal to a one or two-dimensional array. Alternatively, or in addition, the delivery may be accomplished by or facilitated by temporary modification of the dimensionality, spacing, or other geometric parameters of the array. For example, the spacing can be increased during transfer to allow more room between rows (or columns) for transfer lanes. The delivery may also be accomplished by or facilitated by permanent or intermittent substructures within the array, for instance empty regions or lanes. The delivery may be enhanced by time-sequenced methodologies. For example, in embodiments where an array trap is an array of dipole traps and where a transport module utilizes optical tweezers to place a neutral atom in a target site, the delivery can be aided by reducing, removing, or changing frequency of the trapping laser beams during the transport process or when the tweezer beam has a particular location with respect to the optical lattice.

Figure 5:
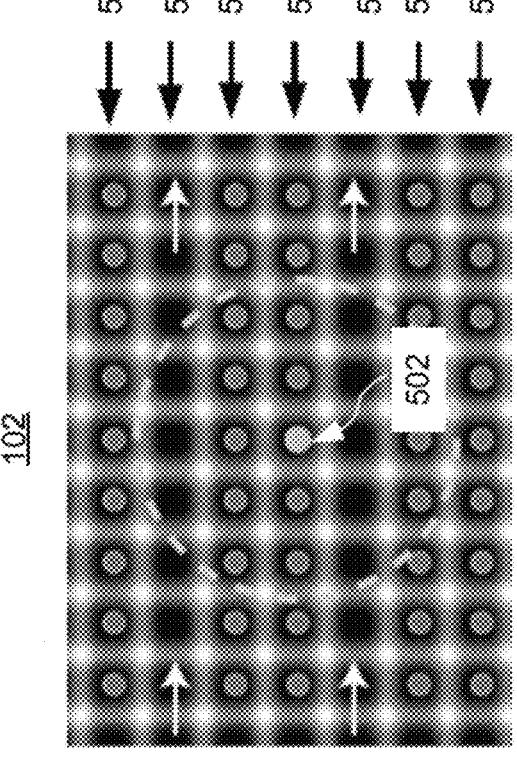
FIG. 5 is a gray-scale representation of a qubit array in which rows are left vacant so that they can serve as transfer lanes.

FIG. 5 illustrates a "structured" loading geometry for system 100 (FIG. 1) that reserves some rows of trap sites for reloading transport purposes. In this reloading geometry, trap sites of qubit-array trap 102 are arranged in a plurality of rows, including rows 510 and rows 520. Rows 510 are dedicated to quantum-state carrier (QSC) molecules array 112 (FIG. 1), whereas rows 520 are left unoccupied to instead be used as lanes for transporting molecules to target sites in rows 510, such as empty site 502. In the example depicted in FIG. 5, each occupied row 510 has an adjacent row 520 for transport of a molecule to any target sites that occur in row 510. The combined set of rows 510 and 520 may be substantially equidistant or irregularly spaced.

The loading geometry of FIG. 5 is "structured" in that the array includes features designed to achieve a purpose, in this case, transfer lanes that allow molecules to be transferred to a site without disturbing molecules in occupied sites. In the embodiment of FIG. 5, the qubit-site array is regular (and, so, not structured) in that the spacing between adjacent sites is constant across the array. However, the qubit array itself is structured by virtue of not filling rows 520 with molecules in a transport-based initial loading scheme. In an alternative embodiment, the qubit-site array is structured in that the spacing of qubit sites is not constant across the array so as to leave transport lanes which minimize disturbance of occupied sites. The structuring can be persistent or temporary. For example, a qubit-site array and its contents can be temporarily structured to create a transport path in response to a vacancy detection. In one scenario, the spacing of rows including and below (given the orientation in FIG. 5) a target site can be temporarily compressed to create a transport lane just above and adjacent to the target site.

Figure 6:
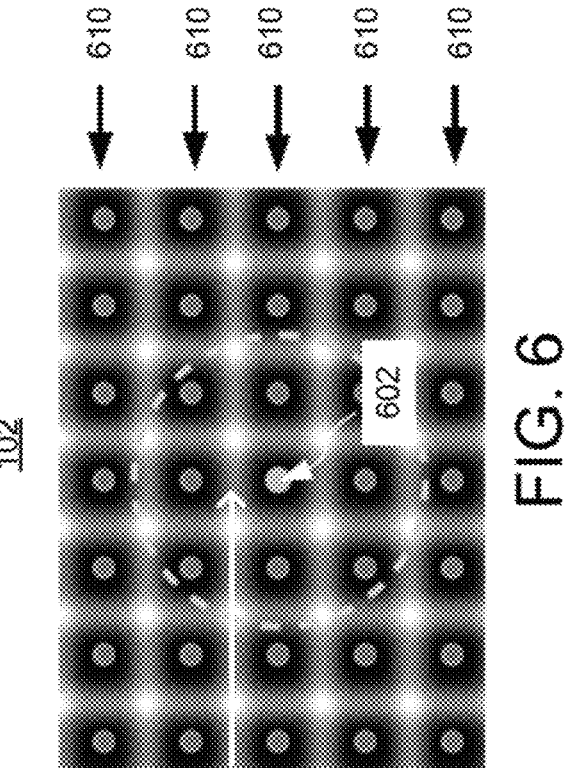
FIG. 6 is a gray-scale representation of a qubit array in which all rows are occupied and in which transfer lanes extend between rows.

FIG. 6 illustrates another loading geometry for system 100 (FIG. 1) that utilizes transport between rows of trap sites of qubit-array trap 102 (FIG. 1). In the loading geometry of FIG. 6, trap sites of the array trap are arranged in a plurality of rows 610. When a target site, such as target site 602 is identified in one of the rows, a molecule is transported to the target site along a path that is between adjacent rows 510. The spacing between rows 610 may be increased dynamically during reloading to accommodate the transport path between rows. Each of loading geometries of FIGS. 5 and 6 can be realized with one or more optical tweezers for moving molecules to target sites. In alternative reloading geometries for two-dimensional arrays, molecules are transported to target trap sites along paths that are outside the planar volume of the two-dimensional array.

Figure 7:
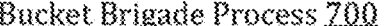
FIG. 7 is a flow diagram of a bucket-brigade loading procedure for the qubit array.
Figure 7:
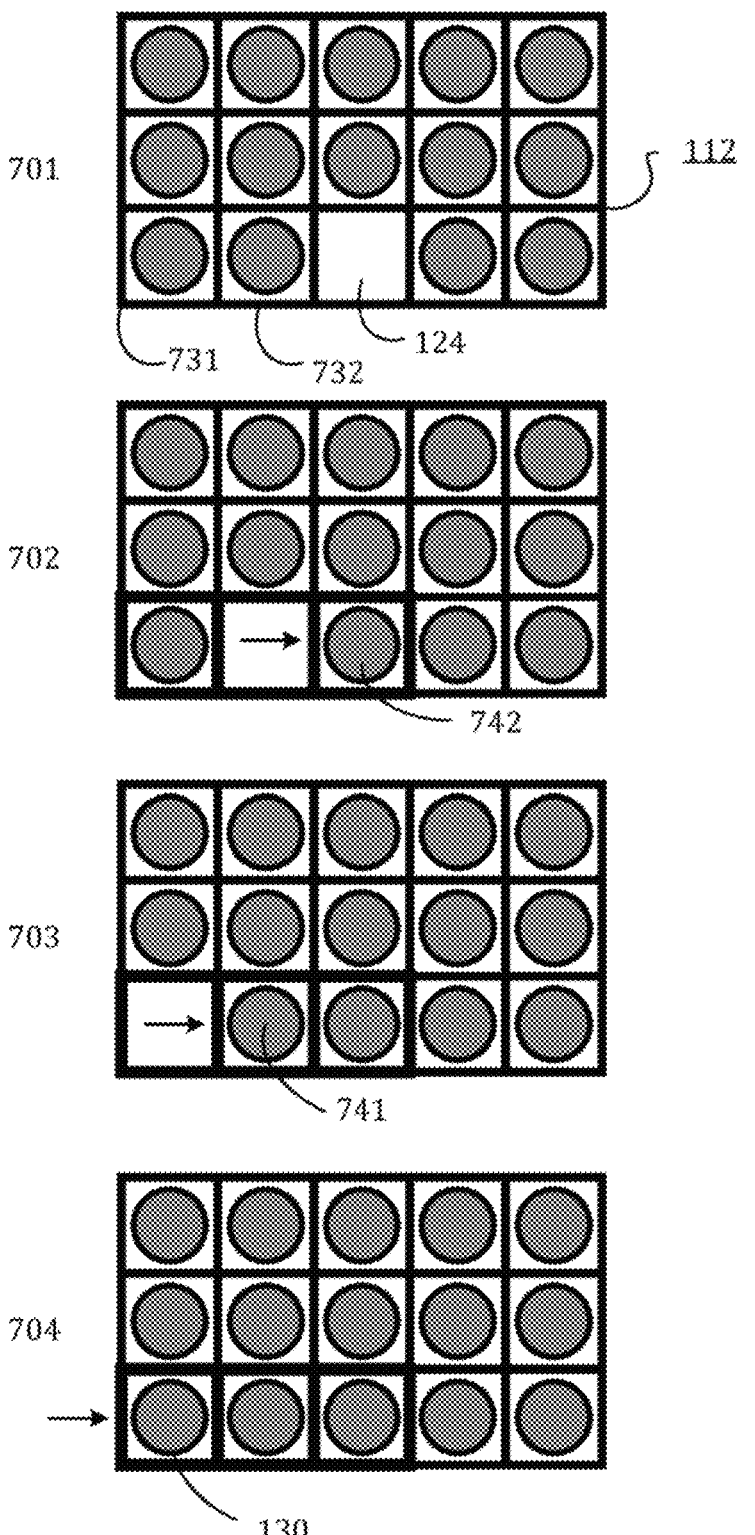

In FIG. 7, a bucket-brigade transport process 700 is diagrammed for a 5×3 site section from the upper left corner (as shown in FIG. 2) of qubit-site array 112. As shown at 701, site 124 is vacant, while the other sites are occupied. At 702, sites 124, 731 and 732 have been identified a target sites. Site 124 has been so identified as it is vacant, presumably due to loss of its molecule. Sites 731 and 732 are designated as target sites because they will be vacated temporarily during molecule transport.

At 702, molecule 742 has been moved from site 732 to site 124, filling the site that lost its molecule, but vacating a neighboring site. At 703, molecule 741, which had resided in array site 731, has been transferred to just-vacated target site 732. At 704 molecule 130 has been transported from loading zone 220 (FIG. 2) to just-vacated target site 731 to complete the bucket-brigade transport procedure. Note, that while FIG. 7 shows sequential transfers, in practice, the transfers of molecules 742, 741, and 130 can be performed concurrently using three tweezers in parallel. Concurrent transport with plural tweezers can also be used to fill plural sites that have been detected to have lost molecules as part of the identification process. While, for example, a bucket-brigade transfer can be implemented using a single optical tweezer, such a transfer can be implemented faster using plural tweezers in a parallel or pipelined fashion.

To minimize runtime interruptions, some embodiments transport molecules during runtime from the reservoir trap to the qubit-array region continuously, periodically or intermittently. In that case, a molecule can be plucked from the loading zone immediately after a target site is identified without waiting for a molecule to be transferred from the reservoir trap. In other embodiments, molecules are not transported from the reservoir during runtime.

In some embodiments, a transport module provides for transporting a molecule from within a qubit-array region to a target site during runtime. In some of those embodiments, runtime operation is limited to sections of the qubit array not including target sites. For example, if, as in FIGS. 1, 2, and 7, all target sites are within the upper left quadrant of the qubit array, program manipulations can be precluded in the upper left quadrant, but allowed in the other three (upper right, lower left, and lower right) quadrants.

System 100 can be configured to pre-cool molecules prior to loading into target site 124; for example to a cold temperature, e.g., below 300 microKelvin. In this embodiment, system 100 can deliver a molecule in its motional ground state into target site 124. Reservoir trap 104 can be configured to cool molecules in reservoir 120 and/or cooling can be applied to a molecule during its transport to target site 124. Cooling applied during transport can include Doppler cooling, sideband cooling, evaporative cooling, or other cooling methods known in the art. Cooling applied during transport can serve to cool a molecule to a temperature below that of reservoir molecules 122 and/or to mitigate transport-induced heating of molecules.

Figure 8A:
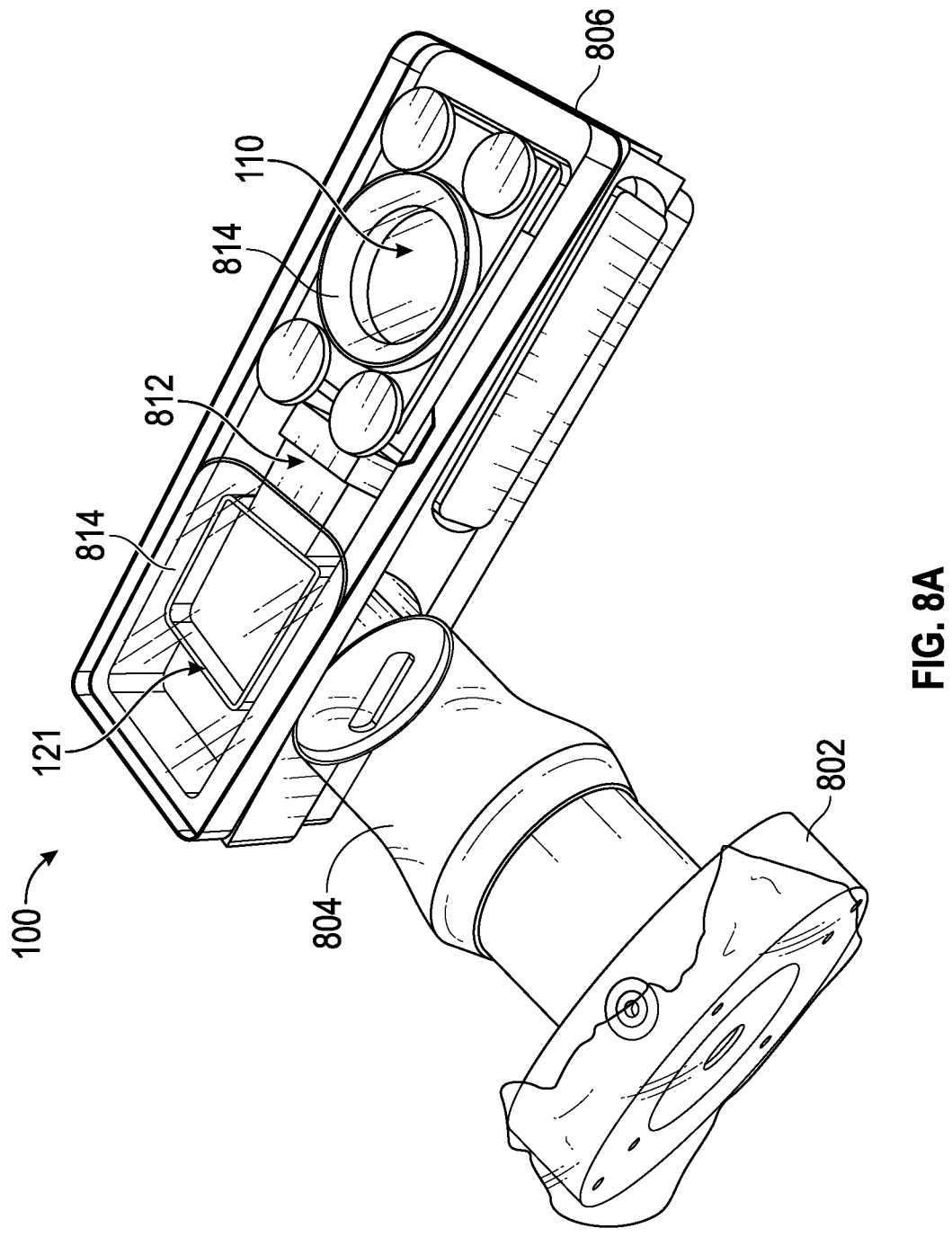
FIG. 8A is a gray-scale photograph of a vacuum structure for the qubit-array system of FIG. 1.
Figure 8B:
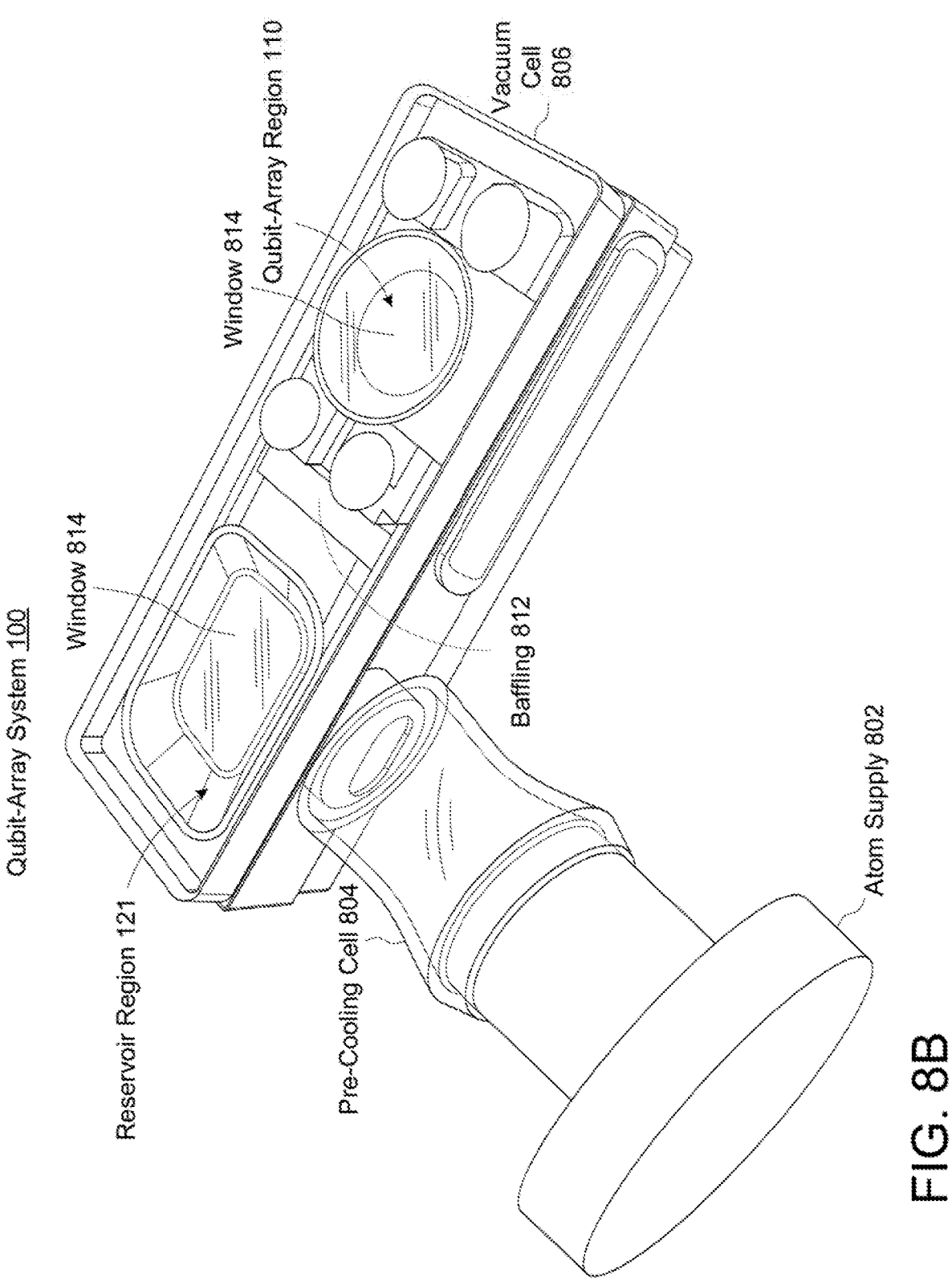
FIG. 8B is a schematic line drawing of a vacuum structure for the qubit-array system of FIG. 1.
Figure 9A:
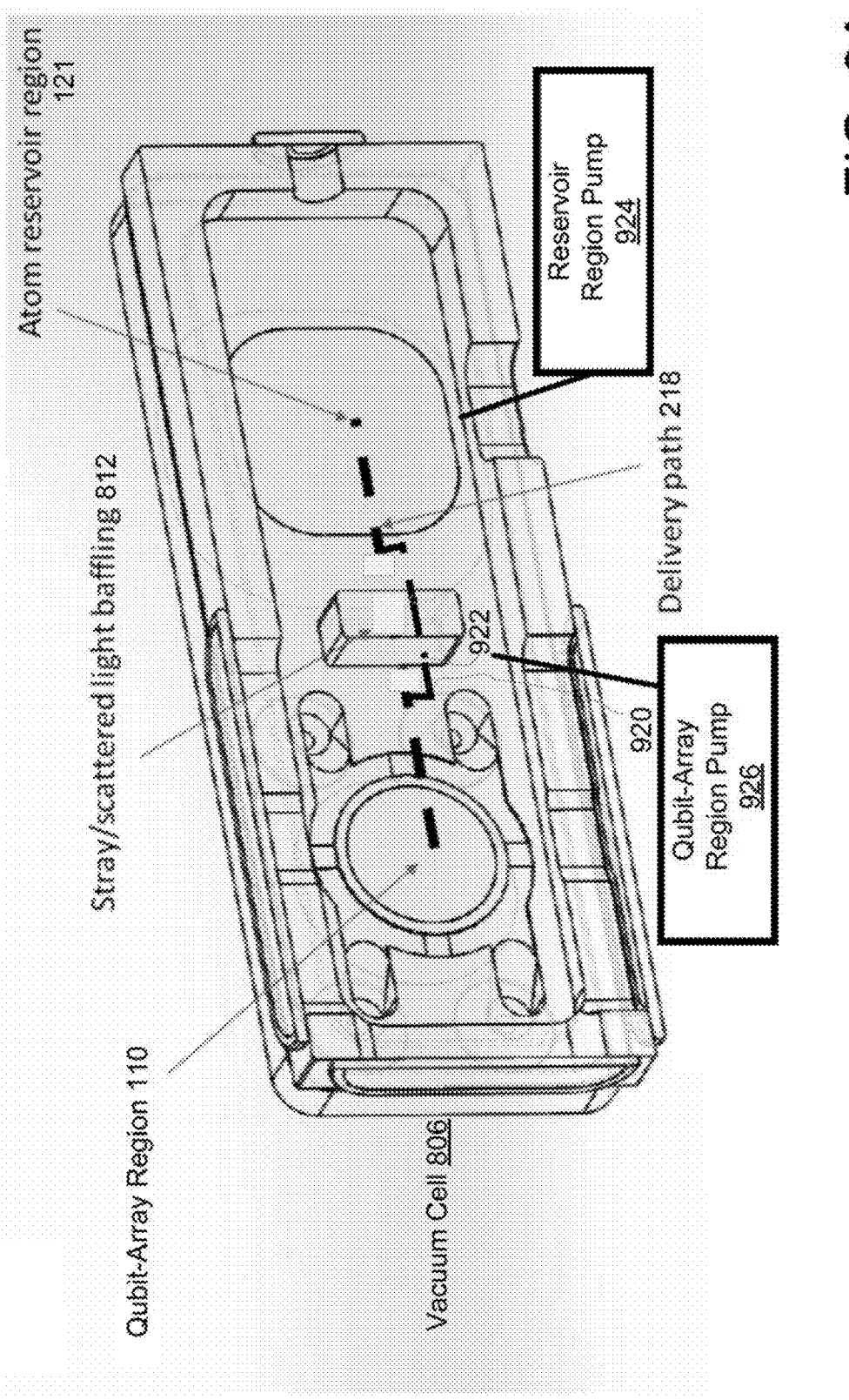
FIG. 9A is a gray-scale diagram of the vacuum structure of FIG. 8.
Figure 9B:
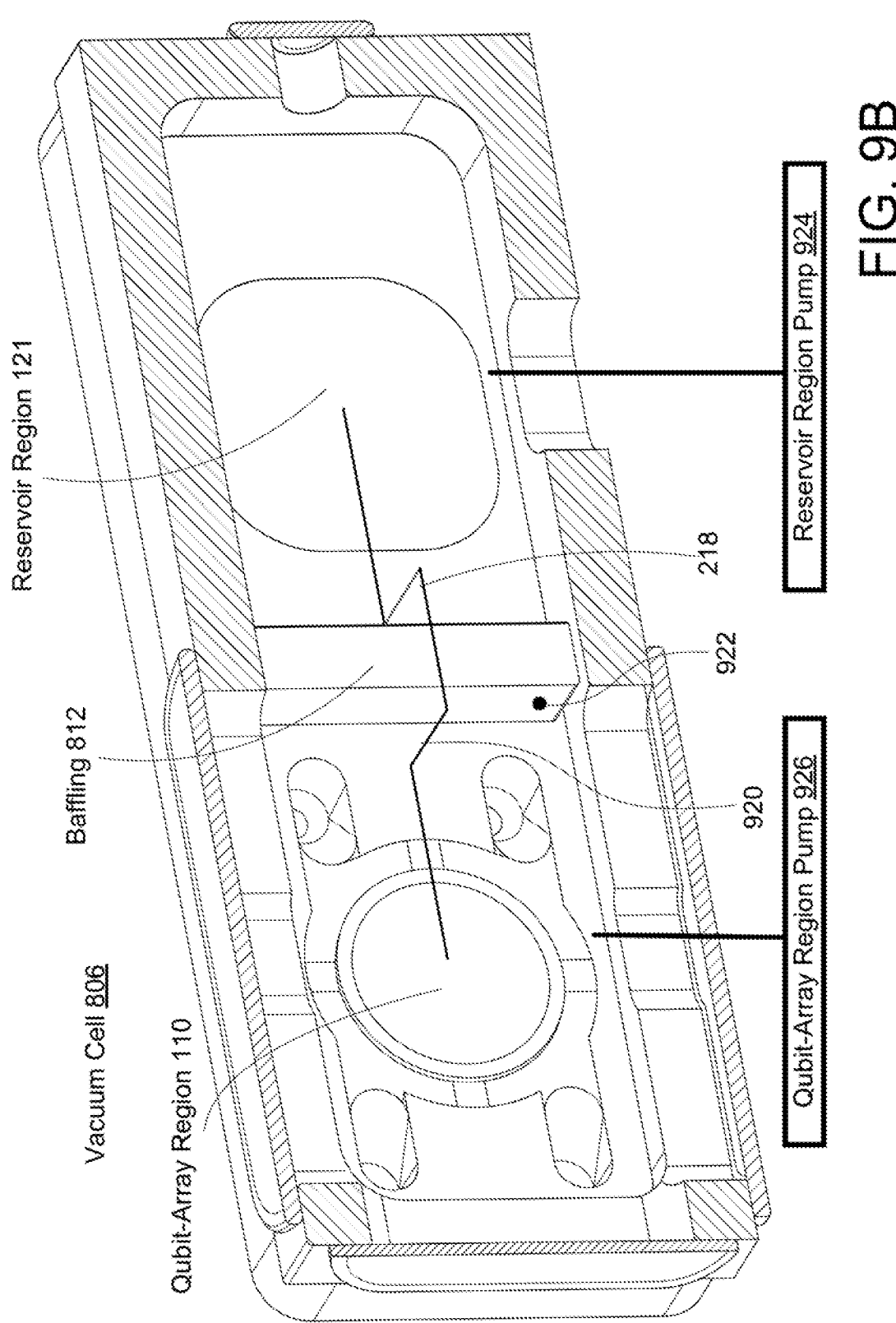
FIG. 9B is a schematic diagram of the vacuum structure of FIG. 8.

As shown in FIGS. 8A and 8B, qubit-array system 100 includes a molecule supply chamber 802, a pre-cooling cell 804, and a vacuum chamber 806, which is shown in schematic form in FIGS. 9A and 9B. Vacuum chamber 806 includes reservoir region 121, and qubit-array region 110. Between regions 121 and 110 is baffling 812 to keep scattered light from reservoir region 121 from interfering with the states of qubit molecules 118 (FIG. 1). Baffling 812 is made of and is coated with absorbent materials for absorbing light, e.g., including frequencies use to establish reservoir trap 104.

The separation distance between regions 121 and 110 and the action of baffling 812 help maintain high fidelity quantum operations. The resulting isolation entails implementing physical separation between reservoir 120 and qubit register region 110, while also suppressing propagation of stray/scattered light and/or background gas from reservoir 120 to qubit-array region 110. Herein, "stray light" refers to light that is reflected off auxiliary surfaces of the system (such as vacuum-chamber walls), whereas scattered light refers to light that is scattered by molecules (such as molecules 122 in reservoir 120). In other embodiments, there can be zero or more than one baffle between regions 121 and 110.

In addition to or as an alternative to baffling, embodiments provide for suppressing stray/scattered light using highly transmissive materials and coatings (e.g., to encourage transmission rather than reflection of light incident on chamber walls). For example, windows 814 (FIGS. 8A and 8B) use highly transmissive glass and coatings for this purpose.

In addition, elements in addition to baffling 812 can use highly absorptive materials or coatings.

For scattered light mitigation, system 100 can employ transport geometries with intermediate transport zones that eliminate lines-of-sight between reservoir trap 120 and qubit register region 116. For example, detour 920 in FIGS. 9A and 9B converts delivery path 218 into a multi-segment path that avoids a line-of-sight light path between reservoir trap 104 and qubit-array region 110.

For gas mitigation, system 100 provides passive and active pumping between qubit register region 116 and a region containing reservoir. Such pumping is, for example, achieved by one or more pumps 924 selected from the groups consisting of ion pumps, sublimation pumps, bulk or sintered getter pumps, and deposited getter coatings. In embodiments, a qubit array region and the reservoir region are separated by differential pumping baffling aperture 922, and include additional pumps 926 (for example of the types mentioned above) in the qubit array region.

Herein, "non-destructive detection" means detection that does not disturb any relevant state of a system, which in this case includes the molecules in the qubit array. The relevant state includes the presence or absence of a molecule at a qubit-array site; therefore, a non-destructive detection would not cause the unintentional loss of a molecule from the qubit array. In the case of runtime operation, the relevant states further include the quantum states of the molecules; thus the non-destructive detection would not cause any molecules to fall out of superposition or otherwise change quantum states of the molecules in the array. Herein, "cold" molecules have associated temperatures below one millikelvin. The environment for the reservoir and the qubit array can be at an ultra-high vacuum (UHV), i.e., below $10^{-9}$ Torr.

Herein, all art labelled "prior art", if any, is admitted prior art; art not labelled "prior art", if any, is not admitted prior art. The embodiments described herein, variations thereupon, and modifications thereto are provided for by the present invention, the scope of which is defined by the following claims.

What is claimed is:

1. A qubit-array system comprising:
   a qubit-array trap including a qubit-site array of qubit sites and configured to trap cold molecules in respective ones of the qubit sites so as to define a qubit-array, the qubit-array trap being located in a qubit-array region;
   a reservoir trap located outside the qubit-array region and configured to trap molecules;
   an inter-region transport module configured to generate a moving standing wave of light to transport a cold molecule from the reservoir trap into a loading zone of the qubit-array region; and
   optical tweezers configured to transport a cold molecule from the loading zone of the qubit-array region to a target qubit site of the qubit-site array.

2. The qubit-array system of claim 1, wherein the reservoir trap is spaced at least 2 mm from the qubit-array region.

3. The qubit-array system of claim 1, wherein the reservoir trap is spaced at least 10 mm from the qubit-array region.

4. The qubit-array system of claim 3, wherein the reservoir trap is spaced at most 100 mm from the qubit-array region.

5. The qubit-array system of claim 1, wherein a target site is vacant due to a loss of a molecule from that site.

6. The qubit-array system of claim 1, wherein the target qubit site has been vacated due to removal of a molecule from that site to a neighboring site as part of a bucket-brigade procedure to fill another target site from which a molecule was lost.

7. The qubit-array system of claim 1, wherein the optical tweezers are configured to provide for transport of a molecule that has been transported from the reservoir trap into the qubit-array region to a target qubit site while a program manipulates qubit values of molecules in a section of the qubit-array not including a target site.

8. The qubit-array system of claim 7, wherein the optical tweezers are configured to use multiple tweezers concurrently.

9. The qubit-array system of claim 8, wherein the optical tweezers are configured to use the multiple tweezers to implement concurrent or pipelined loading of molecules into respective target sites.

10. The qubit-array system of claim 7, wherein the optical tweezers are configured to use bucket-brigade loading of a molecule into target site.

11. The qubit-array system of claim 1, wherein the molecules are monatomic molecules.

12. The qubit-array system of claim 11, wherein the monatomic molecules are neutral atoms.

13. The qubit-array system of claim 12, wherein the neutral atoms are of alkali or alkaline-earth elements.

14. The qubit-array system of claim 1, wherein the reservoir trap is configured to cool molecules as they are transported from the reservoir trap to the loading zone of the qubit-array region.

15. The qubit-array system of claim 1, wherein the qubit-array is structured so as to define a transport path to the target qubit site.

16. The qubit-array system of claim 15, wherein the qubit-array is structured by compressing rows or columns of the qubit-site array.

17. The qubit-array system of claim 1, further comprising transmissive materials configured to reduce reflections of light from a reservoir region of the reservoir trap into the qubit-array region.

18. The qubit-array system of claim 1, further comprising absorbent materials to absorb light that otherwise could escape a reservoir region of the reservoir trap into the qubit-array region.

19. The qubit-array system of claim 1, further comprising gas mitigation using pumps on either side of a pressure-differential aperture between the reservoir trap and the qubit-array region.

20. The qubit-array system of claim 1, wherein the optical tweezers are configured to transport the cold molecule to the target qubit site partially along a plane through all the qubit sites of the qubit-site array.

21. The qubit-array system of claim 1, wherein the optical tweezers are configured to transport the cold molecule to the target qubit site partially parallel to a plane through all the qubit sites of the qubit-site array.

22. The qubit-array system of claim 21, wherein the optical tweezers are configured to transport the cold molecule to the target qubit site partially orthogonal to the plane through all the qubit sites of the qubit-site array.

23. A qubit-array loading process comprising:
   selecting a target site of a qubit-site array, the qubit-site array being at least partially populated by resident molecules and located within a qubit-array region;
   transporting, using a moving standing wave of light, a cold molecule from a reservoir trap located outside the qubit-array region into a loading zone of the qubit-array region; and transporting, using optical tweezers, the cold molecule from the loading zone of the qubit-array region to the target site of the qubit-site array.

24. The qubit-array loading process of claim 23, wherein transporting from the reservoir trap to the qubit-array region is over a distance of at least 2 mm.

25. The qubit-array loading process of claim 23, wherein transporting from the reservoir trap to the qubit-array region is over a distance of at least 10 mm.

26. The qubit-array loading process of claim 25, wherein the reservoir trap is spaced at most 100 mm from the qubit-array region.

27. The qubit-array loading process of claim 23, wherein a target site is vacant for a duration of a transport from within the qubit-array region to the target site.

28. The qubit-array loading process of claim 23, wherein the target site has been vacated due to removal of a molecule from that site to a neighboring site as part of a bucket-brigade procedure to fill another target site that was vacated due to loss of a molecule from the qubit-site array.

29. The qubit-array loading process of claim 23, wherein transporting of the cold molecule from the reservoir trap to the qubit-array region occurs during storing a value computed by a quantum-logic language in the qubit-site array.

30. The qubit-array loading process of claim 23, wherein transporting the cold molecule from the reservoir trap to the loading zone includes manipulating qubit values of molecules located in sections of the qubit-site array not including a target site while a molecule is transported to a target site.

31. The qubit-array loading process of claim 23, wherein transporting the cold molecule from the reservoir trap to the loading zone includes using multiple optical tweezers concurrently.

32. The qubit-array loading process of claim 31, wherein transporting the cold molecule from the reservoir trap to the loading zone uses the multiple optical tweezers to implement concurrent or pipelined loading of molecules into respective target sites.

33. The qubit-array loading process of claim 23, wherein transporting includes loading of a molecule into a target site using a bucket-brigade procedure.

34. The qubit-array loading process of claim 23, wherein the reservoir trap is populated with monatomic molecules.

35. The qubit-array loading process of claim 34, wherein the monatomic molecules are neutral atoms.

36. The qubit-array loading process of claim 35, wherein the neutral atoms are of alkali or alkaline-earth elements.

37. The qubit-array loading process of claim 23, wherein transporting the cold molecule from the reservoir trap to the loading zone includes cooling the cold molecule while it is transported from the reservoir trap.

38. The qubit-array loading process of claim 23, wherein the qubit-site array is structured so as to define a transport path to the target site.

39. The qubit-array loading process of claim 38, wherein the qubit-site array is structured by compressing rows or columns of the qubit-site array.

40. The qubit-array loading process of claim 23, further comprising transmitting light through transmissive materials to reduce reflections of light from a reservoir region of the reservoir trap into the qubit-array region.

41. The qubit-array loading process of claim 23, further comprising absorbing, by absorbent materials, light that otherwise could escape a reservoir region of the reservoir trap into the qubit-array region.

42. The qubit-array loading process of claim 23, further comprising mitigating gas using pumps on either side of a pressure-differential aperture between the reservoir trap and the qubit-array region.

43. The qubit-array loading process of claim 23, comprising transporting the cold molecule from the reservoir trap to the loading zone using optical tweezers, crossed acousto-optic deflectors, multi-channel acousto-optic deflectors, spatial-light modulators, electro-optic modulators or liquid crystal modulators.

44. The qubit-array loading process of claim 23, comprising transporting the cold molecule to the target site partially along a plane through all qubit-sites of the qubit-site array.

45. The qubit-array loading process of claim 23, comprising transporting the cold molecule to the target site partially parallel to a plane through all qubit sites of the qubit-site array.

46. The qubit-array loading process of claim 45, comprising transporting the cold molecule to the target site partially orthogonal to the plane through all qubit sites of the qubit-site array.

47. The qubit-array loading process of claim 23, further comprising, during transporting the cold molecule from the reservoir trap to the loading zone, manipulating the resident molecules by performing a gate or readout operation.

* * * * *